(12) United States Patent
McCormick et al.

(10) Patent No.: US 11,405,317 B2
(45) Date of Patent: Aug. 2, 2022

(54) PACKET FORWARDING BASED ON GEOMETRIC LOCATION

(71) Applicants: William Carson McCormick, Ottawa (CA); Peter Ashwood-Smith, Gatineau (CA)

(72) Inventors: William Carson McCormick, Ottawa (CA); Peter Ashwood-Smith, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/721,171

(22) Filed: Dec. 19, 2019

(65) Prior Publication Data

US 2021/0194808 A1   Jun. 24, 2021

(51) Int. Cl.
*H04W 56/00* (2009.01)
*H04L 47/10* (2022.01)
*H04L 45/12* (2022.01)
*H04W 84/18* (2009.01)
*H04L 45/48* (2022.01)
*H04L 47/70* (2022.01)

(52) U.S. Cl.
CPC ............ *H04L 47/10* (2013.01); *H04L 45/123* (2013.01); *H04L 45/126* (2013.01); *H04L 45/48* (2013.01); *H04L 47/822* (2013.01); *H04W 84/18* (2013.01)

(58) Field of Classification Search
CPC ..... H04L 47/10; H04L 45/123; H04L 45/126; H04L 45/48; H04L 47/822; H04W 84/18
USPC ........................................................ 370/329
See application file for complete search history.

(56) References Cited

U.S. PATENT DOCUMENTS

| 5,930,348 A | 7/1999 | Regnier et al. |
| 6,147,980 A | 11/2000 | Yee et al. |

(Continued)

FOREIGN PATENT DOCUMENTS

| CN | 1681257 A | 10/2005 |
| CN | 101119372 A | 2/2008 |

(Continued)

OTHER PUBLICATIONS

Edoardo Benzi et al "Optical Inter-Satellite Communication: the Alphasat and Sentinel-1A in-orbit experience"; SpaceOps Conferences, May 16-20, 2016, Daejeon, Korea; 14th International Conference on Space Operations.

(Continued)

*Primary Examiner* — Sai Ming Chan

(57) ABSTRACT

The present invention is provides a method and apparatus for routing a data packet in a network. For each nearby device capable of routing the packet toward a further destination, an associated cost or utility is determined. The device with lowest cost or highest utility is selected and the packet is forwarded toward same. The selecting may use a comparator tree. The cost or utility may be associated with forwarding the data packet from the candidate device toward the further destination. The cost or utility may be based on a distance from candidate device to the further destination, and may be determined using a Haversine function or approximation thereof, or by computing an inner product of a first vector and a second vector originating at a center of Earth, the first vector directed toward the candidate device, the second vector directed toward the further destination.

17 Claims, 11 Drawing Sheets

(56) References Cited

U.S. PATENT DOCUMENTS

| | | | |
|---|---|---|---|
| 6,208,295 B1* | 3/2001 | Dogan | G01S 3/74 |
| | | | 342/361 |
| 6,804,199 B1 | 10/2004 | Kelly et al. | |
| 6,816,460 B1 | 11/2004 | Ahmed et al. | |
| 7,613,121 B2 | 11/2009 | Chou | |
| 7,945,272 B2 | 5/2011 | Kim | |
| 10,796,251 B2 | 10/2020 | Frederick et al. | |
| 2004/0028060 A1 | 2/2004 | Kang | |
| 2005/0152333 A1 | 7/2005 | Smith | |
| 2005/0198286 A1* | 9/2005 | Xu | H04L 45/02 |
| | | | 709/225 |
| 2006/0218225 A1 | 9/2006 | Hee Voon et al. | |
| 2007/0147254 A1 | 6/2007 | Larsson | |
| 2007/0239349 A1* | 10/2007 | Ohnishi | G01C 21/3423 |
| | | | 701/410 |
| 2009/0046732 A1 | 2/2009 | Pratt, Jr. et al. | |
| 2010/0008368 A1 | 1/2010 | Karloff | |
| 2012/0014316 A1 | 1/2012 | Rahman | |
| 2012/0173527 A1* | 7/2012 | Thiesson | G06F 16/35 |
| | | | 707/737 |
| 2012/0238235 A1 | 9/2012 | Lee | |
| 2013/0036236 A1 | 2/2013 | Morales et al. | |
| 2013/0232565 A1 | 9/2013 | O'Connor et al. | |
| 2014/0044008 A1 | 2/2014 | Skalecki et al. | |
| 2014/0126416 A1 | 5/2014 | Yu et al. | |
| 2014/0165163 A1 | 6/2014 | Salkintzis | |
| 2014/0177522 A1 | 6/2014 | Marshack | |
| 2014/0229405 A1* | 8/2014 | Govrin | G06N 5/04 |
| | | | 706/11 |
| 2014/0278590 A1* | 9/2014 | Abbassi | G06Q 30/0283 |
| | | | 705/5 |
| 2014/0379929 A1 | 12/2014 | Cicic et al. | |
| 2016/0057004 A1 | 2/2016 | Ge | |
| 2016/0323175 A1 | 11/2016 | Liu | |
| 2017/0117978 A1 | 4/2017 | Ko | |
| 2017/0239394 A1* | 8/2017 | Fromm | A61L 27/54 |
| 2019/0081884 A1 | 3/2019 | Spohn | |
| 2019/0104056 A1 | 4/2019 | Poorrezaei | |
| 2019/0356498 A1 | 11/2019 | Hernandez Sanchez et al. | |
| 2020/0162335 A1 | 5/2020 | Chen et al. | |
| 2020/0382445 A1* | 12/2020 | Calmon | H04L 67/10 |
| 2021/0194808 A1 | 6/2021 | McCormick | |
| 2022/0026519 A1* | 1/2022 | Wu | G01S 13/003 |

FOREIGN PATENT DOCUMENTS

| | | |
|---|---|---|
| CN | 102118456 A | 7/2011 |
| CN | 102752725 A | 10/2012 |
| CN | 103891352 A | 6/2014 |
| CN | 103986512 A | 8/2014 |
| CN | 104579454 A | 4/2015 |
| CN | 105657777 A | 6/2016 |
| CN | 107070798 A | 8/2017 |
| CN | 107231183 A | 10/2017 |
| CN | 107979409 A | 5/2018 |
| CN | 108353439 A | 7/2018 |
| CN | 108390713 A | 8/2018 |
| CN | 108449774 A | 8/2018 |
| CN | 108989223 A | 12/2018 |
| CN | 110505153 A | 11/2019 |
| CN | 111587580 A | 8/2020 |
| EP | 2853068 A1 | 4/2015 |
| WO | 2016069077 A1 | 5/2016 |
| WO | 2019173127 A1 | 9/2019 |
| WO | 2020113214 A1 | 6/2020 |
| WO | 2020193445 A1 | 10/2020 |

OTHER PUBLICATIONS

Hemani Kaushal et al "Optical Communication in Space: Challenges and Mitigation Techniques"; Citation information DOI 10.1109/COMST.2016.2603518, IEEE Communications Surveys & Tutorials.

M. Gregory et al "TESAT laser communication terminal performance results on 5.6Gbit coherent inter satellite and satellite to ground links"; International Conference on Space Optics—ICSO 2010, Rhodes Island, Greece, Oct. 4-8, 2010.

Zengyin Yang et al "Modeling and Routing for Predictable Dynamic Networks"; arXiv.org > cs > arXiv:1704.00885; Aug. 17, 2018.

"Iridium NEXT: A Global Effort to Launch the Future of Global Communications"; Apr. 19, 2013 | Featured Stories, Iridium NEXT.

Hueseyin Uzunalioglu et al "A routing algorithm for connectionoriented Low Earth Orbit (LEO) satellite networks with dynamic connectivity"; Published 2000 • Computer Science • Wireless Networks.

Fargnoli, Joseph D. (2016), Technical Narrative, Theia Holdings A, Inc. (Theia Satellite Network), 1455 Pennsylvania Ave. , Ste. 600, Washington, D.C., District of Columbia, United States.

"Geographic Routing"; Wikipedia, Nov. 20, 2019; https://en.wikipedia.org/wiki/Geographic_routing.

"Chapter 6 Geometric Routing" Mobile Computing Winter 2005 / 2006; https://disco.ethz.ch/courses/ws0506/mobicomp/lecture/6/Chapter6GeometricRouting4Slides_v2.pdf.

"Haversine Formula", Wikipedia, Aug. 7, 2019; https://en.wikipedia.org/wiki/Haversine_formula.

Sahhaf et al. Scalable and energy-efficient Optical Tree-based Greedy Router, 2013 15th International Conference on Transparent Optical Networks (ICTON) ,Sep. 19, 2013, 5 pages.

Akhavain Mohammadi, Mehdi Arashmid et al. U.S. Appl. No. 17/141,824, filed Jan. 5, 2021.

Halabian, Hassan et al. U.S. Appl. No. 16/888,023, filed May 29, 2020.

Ashwood-Smith, Peter et al. U.S. Appl. No. 16/887,675, filed May 29, 2020.

McCormick, William Carson U.S. Appl. No. 16/882,952, filed May 26, 2020.

Akhavain Mohammadi, Mehdi Arashmid, U.S. Appl. No. 17/167,540, filed Feb. 4, 2021.

Akhavain Mohammadi, Mehdi Arashmid U.S. Appl. No. 17/140,668, filed Jan. 4, 2021.

Akhavain Mohammadi, Mehdi Arashmid U.S. Appl. No. 17/117,333, filed Dec. 10, 2020.

Ericsson Latency analysis of SCell BFR solutions 3GPPTSG-RAN }VGI Meeting #97, R1-1907438 May 17, 2019 (May 17, 2019), 4 pages.

* cited by examiner

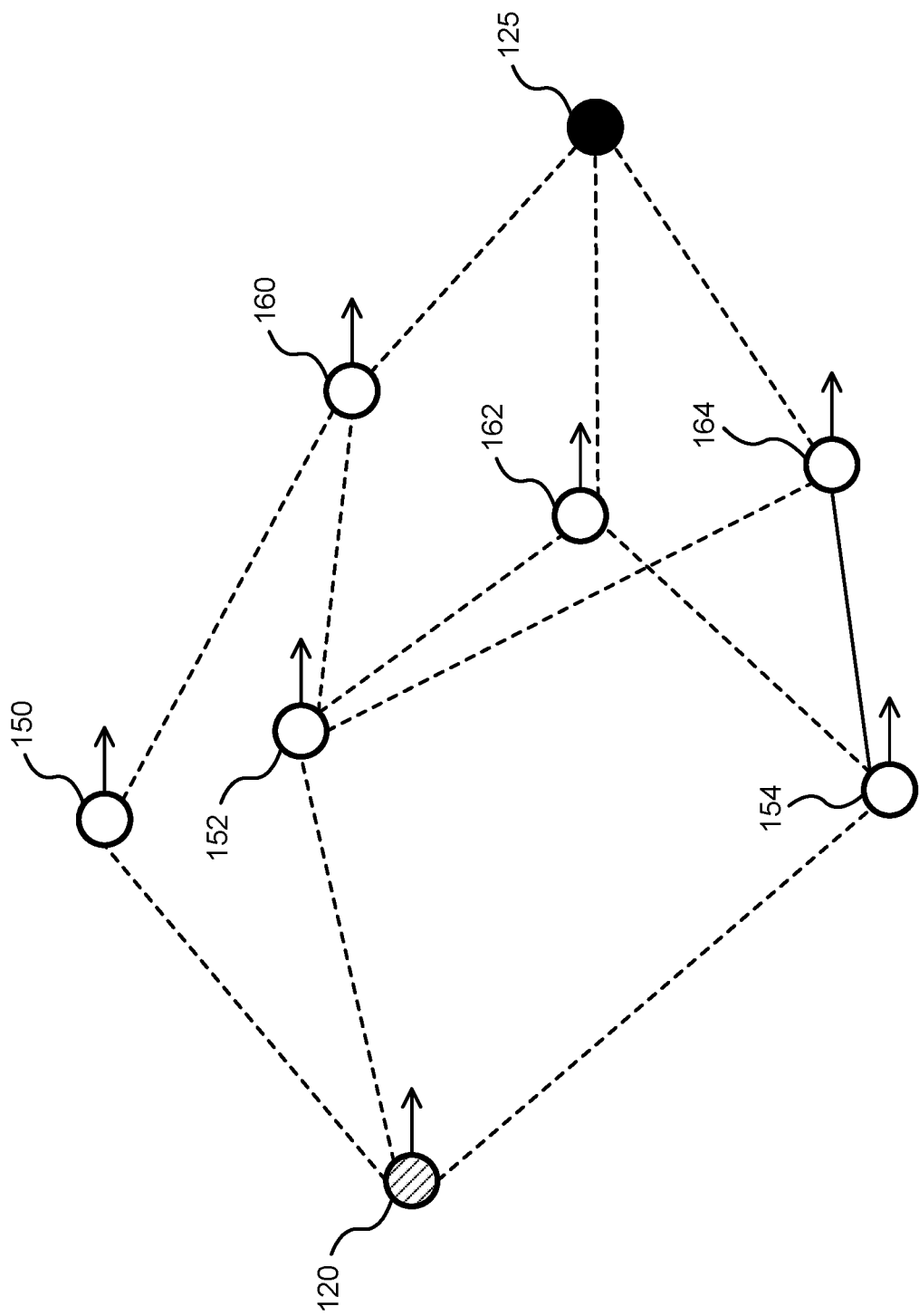

PACKET FORWARDING BASED ON GEOMETRIC LOCATION

CROSS-REFERENCE TO RELATED APPLICATIONS

This is the first application filed for the present invention.

FIELD OF THE INVENTION

The present invention pertains to packet-based data networks, such as optical satellite mesh networks, and in particular to a method and apparatus for supporting packet forwarding in such networks.

BACKGROUND

Low earth orbit (LEO) satellite constellations are being developed to provide, among other things, wireless data networking services including access to data networks such as the Internet. It is currently proposed that a group of satellites would be distributed in space and organized into a mesh network. Free space optical (i.e. laser) links are proposed as one way for providing high-bandwidth network connectivity between satellites. Other types of links, such as radiofrequency or microwave-based links are also possible.

Data packets can be routed through the satellite mesh network along a variety of paths. Because satellites in a LEO constellation are moving rapidly with respect to the surface of the earth, routing of packets toward an earth-based destination requires consideration of satellite locations and proximity to the destination location. Computing effective routing paths in such scenarios requires determining the satellite to which data should be routed and then determining a path through the network to the determined satellite. These operations can be computationally intensive and current routing methods are subject to improvement and customization to satellite mesh networking.

Geographic routing involves routing of packets based on geographic position information. Geographic routing schemes make use of a geographic location identifier, instead of an otherwise unrelated (and typically static) networking address, as the basis for making routing decisions. Such routing schemes are known for wireless networks but have not been extensively developed for satellite networks.

Therefore, there is a need for a method and apparatus for supporting packet forwarding in satellite mesh networks and similar networks that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for packet forwarding, for example in satellite networks, in which paths are selected based on geographic information.

In accordance with embodiments of the present invention, there is provided a method for routing a data packet in a network. The method includes, for each one of a plurality of destination devices capable of further handling of the data packet for routing toward a further destination, determining a respective cost or utility associated with forwarding the data packet to said one of the plurality of destination devices. The method further includes selecting one of the plurality of destination devices based at least in part on cost or utility; and forwarding the data packet to said selected one of the plurality of destination devices.

In accordance with embodiments of the present invention, there is provided an apparatus for routing a data packet in a network. The apparatus includes a cost determiner configured, for each one of a plurality of destination devices capable of further handling of the data packet for routing toward a further destination, to determine a respective cost or utility associated with forwarding the data packet to said one of the plurality of destination devices. The apparatus further includes a destination selector configured to select one of the plurality of destination devices. The apparatus further includes a packet forwarder configured to forward the data packet to said selected one of the plurality of destination devices.

The selecting of one of the plurality of destination devices may include selecting a particular one of the plurality of destination devices having a lowest cost or highest utility, and the selecting may be performed using a comparator tree. The cost or utility may be a cost or utility associated with forwarding the data packet from said one of the plurality of destination devices toward the further destination. The cost or utility may be based on a distance from said one of the plurality of destination devices to the further destination, and may be determined using a Haversine function or approximation thereof, or by computing an inner product of a first vector and a second vector, the first vector originating at a first location, such as a center of Earth and directed toward said one of the plurality of destination devices, the second vector originating at the first location and directed toward said further destination.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 1C illustrates part of a satellite constellation in communication with a ground-based destination, according to another embodiment of the present invention.

It will be noted that throughout the appended drawings, like features are identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

When using a mesh network of LEO satellites to route a packet to a ground-based destination, it is notable that the satellite constellation typically moves rapidly relative to the destination. This may make it difficult to determine which satellite is closest to a destination. This in-LEO network destination will change over time for a given ground-based station, so the process used in then determination of the final LEO satellite should be efficient and easy to implement. Knowing the destination location aids in the selection of the in-LEO constellation satellite. Without knowing this satellite, a path through the network cannot be selected. For example, it is desirable to determine which satellite is currently closest (or adequately close) to the ground destination so that the packet can be routed toward that satellite. Constellation geometry can be used to facilitate such routing. In particular, according to embodiments of the present invention, the satellite constellation can be configured to route packets to the satellite which is geometrically closest to the destination location. To facilitate this, geographic routing may be employed in which the destination address for each packet includes an indication of a geometric (geographic) location of the destination of the packet. This location can be part of the destination address, for example.

Figure 1A:
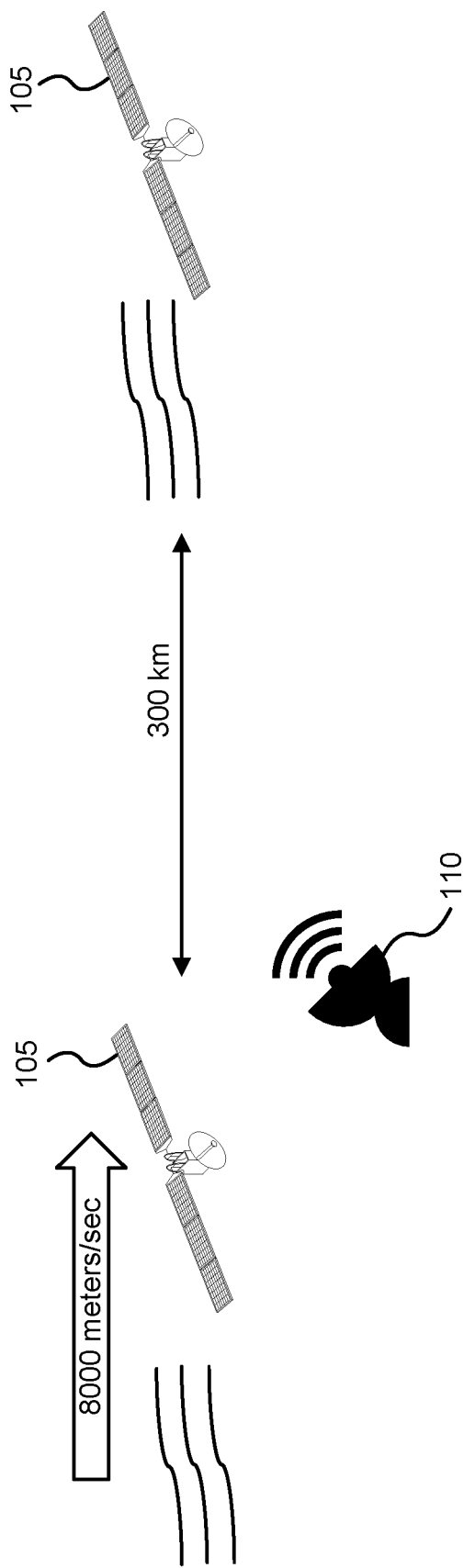
FIG. 1A illustrates a satellite moving rapidly relative to a ground-based destination communicatively coupled thereto, according to a prior art scenario to be addressed by embodiments of the present invention.

FIG. 1A illustrates a fundamental technical challenge, in which a satellite 105 moves rapidly (e.g. at 8000 m/s) relative to a ground-based destination 110. In less than one minute, an overhead satellite can move 300 with respect to the destination. As such, routes to a destination have to be timely updated. It should be understood by those skilled in the art that although described here as a ground station, the destination outside the LEO network need not be a ground based, nor does it need to be stationary. In some situations it may be a moving target such as a boat or a plane. The term ground station will be used for simplicity with the understanding that it should not be regarded as limiting.

Figure 1B:
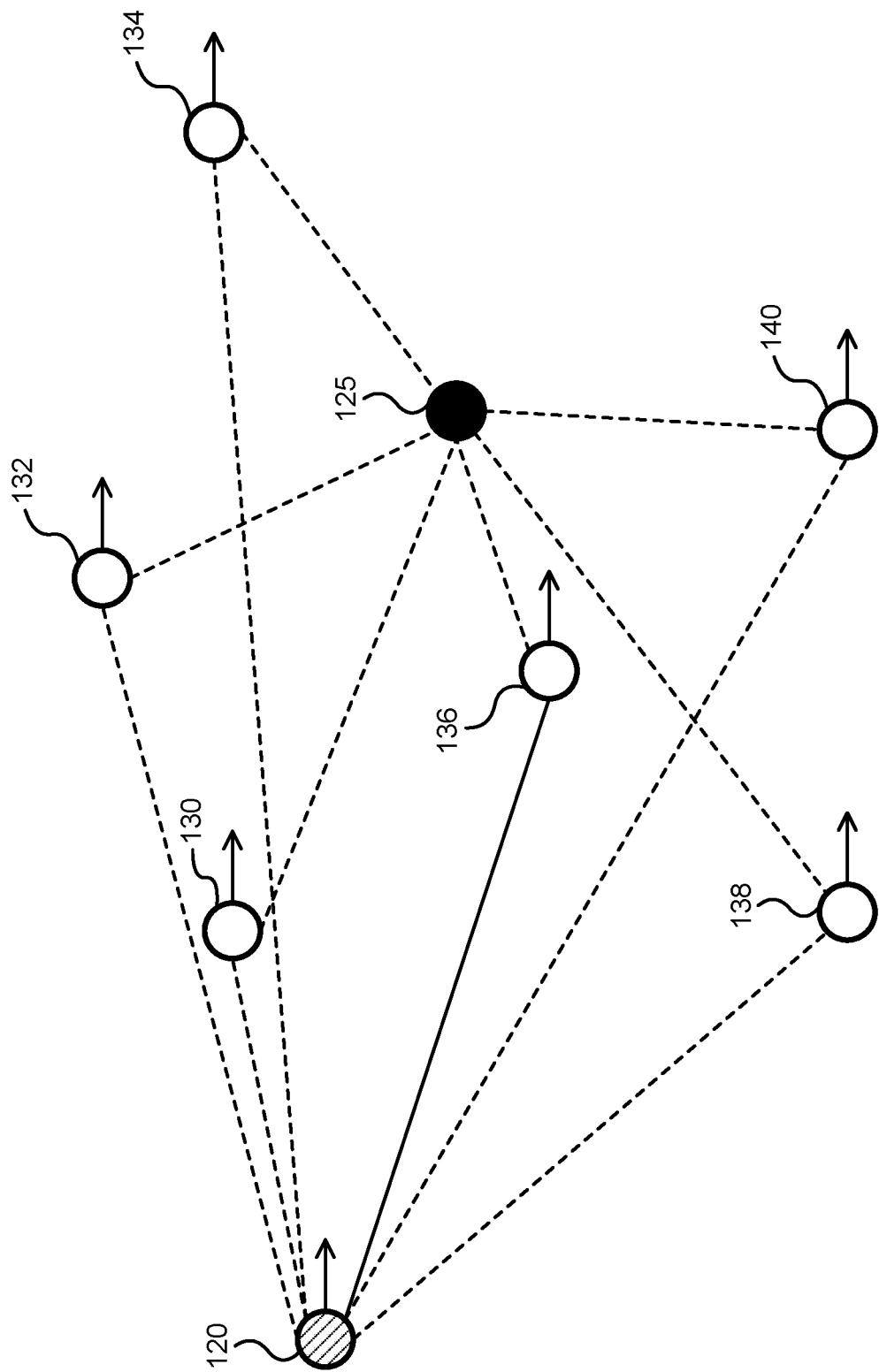
FIG. 1B illustrates part of a satellite constellation in communication with a ground-based destination, according to an embodiment of the present invention.

FIG. 1B illustrates, by way of example, part of a satellite constellation including a first satellite 120 holding a data packet for forwarding to a ground-based destination 125, and multiple intermediate satellites 130, 132, 134, 136, 138, 140. Communication links are shown by dashed lines and the satellites are moving relative to ground. Due to density of satellites in the constellation, and the size of the coverage area of a single satellite, there may be more than one satellite that can transmit packets to the destination 125. Although each intermediate satellite can communicate to the destination 125, it may be desirable to have communication to the destination performed by a satellite which is closest to the destination. In this scenario, each of the intermediate satellites 130, 132, 134, 136, 138, 140 can directly communicate with the destination 125.

FIG. 1C illustrates, by way of another example, part of a satellite constellation again including a first satellite 120 holding a data packet for forwarding to a ground-based destination 125, and multiple intermediate satellites 150, 152, 154 linked to the first satellite 120 but not directly linked to the destination 125. Further intermediate satellites 160, 162, 164 are linked to the destination 125 but not directly linked to the first satellite 120. However, the intermediate satellites 150, 152, 154 are communicatively linked to the further intermediate satellites 160, 162, 164. As such, the first satellite can communicate with the destination via a three-hop path. Further scenarios with communication links involving different numbers of hops are also applicable.

It is noted that, in each of the scenarios of FIGS. 1B and 1C, each intermediate satellite to which the first satellite 120 can potentially transmit the data packet is a discernible physical distance away from the destination 125. This distance can be used to represent a type of cost associated with forwarding the packet to that particular intermediate satellite. When an intermediate satellite is further from the destination, it may be considered less desirable to route the data packet to that intermediate satellite, and hence the cost is higher. This is applicable as a metric whether or not the intermediate satellite can transmit the data packet directly to the destination (although scenarios can be contrived in which the total path length traversed by the data packet is not minimized under this "greedy" forwarding approach).

More generally, given a data packet at a first location (e.g. first satellite), a cost or utility can be associated with forwarding the data packet to a destination device, such as an intermediate satellite directly communicatively coupled to the first satellite. This can be further generalized, in some instances, to destination devices indirectly coupled to the first location, however for simplicity only direct couplings are considered herein. Once such costs are utilities are determined, the destination device associated with a relatively low (or lowest) cost, or a relatively high (or highest) utility can then be selected and the data packet can be forwarded to the selected destination device. In dynamic networks such as rapidly orbiting satellite constellations or networks in which destination devices move frequently, the costs or utilities can be updated as needed. In general, costs or utility metrics can reflect distance, signal quality, charges levied, bandwidth limitations, quality of service or fairness limitations, etc.

A routing system typically consists of different subsystems. Two notable subsystems are referred to herein as the control plane and the forwarding plane. The forwarding plane is also sometimes called the user plane or the data plane. The control plane is responsible for monitoring the network topology and building routes. These routes may be programmed into the forwarding table, which uses them to actually forward the packets. The forwarding table is often implemented in hardware for higher performance systems, and in software (for example, Linux includes an IP forwarding plane in the kernel) for lower performance systems.

According to various implementations, the forwarding plane makes use of a forwarding table that is configured with a list of data entries (tuples), each containing a destination address and a corresponding interface. To forward a packet to a given destination address, the corresponding interface is used. Interfaces may correspond to particular optical communication links, for example. Interfaces can be free space optical links between satellites for example. Different interfaces may map to different communication links. Interfaces can correspond to virtual interfaces, which in turn may correspond to one or more physical interfaces. The destination address may contain a geometric location and potentially other routing information. As is common with geometric or geographic routing, the destination address may indicate a physical location rather than a network-based location (e.g. numerical identifiers in a list of successive subnets). For example, the physical location can be included in the address in a predetermined format. That is, a header field can include a value that can be mapped, according to a predetermined rule, to a physical location for example on a spherical surface.

Physical locations of destination devices or further destinations may be fixed or variable. For example, satellites in low earth orbit may have variable location with respect to a geographic coordinate system, such as but not limited to a latitude/longitude coordinate system. Satellite physical locations may be updated for example based on ephemeris or almanac data, or by reporting or observation, or a combination thereof.

When the forwarding plane is operating, it will receive a stream of packets to be forwarded (for example at a rate on the order of $10^8$ packets per second). For each packet, the forwarding plane is configured to inspect the list of destination addresses, select a set of addresses with minimum cost or maximum utility according to a metric such as a distance-based metric, and then select one of those addresses to which to forward the packet. The interface associated with the address is used for forwarding the packet.

Figure 2:
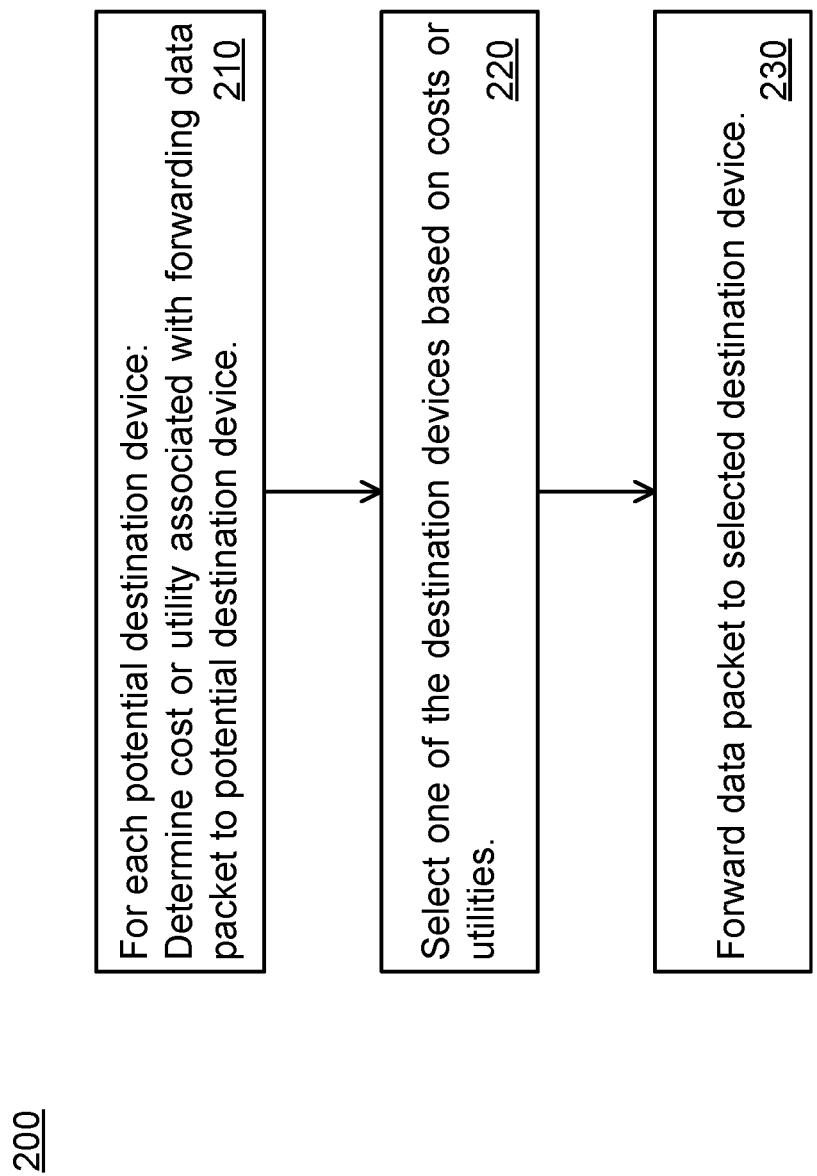
FIG. 2 illustrates a method for routing a data packet in a network, according to embodiments of the present invention.

Accordingly, and with reference to FIG. 2, embodiments of the present invention provide for a method 200 for routing a data packet in a network. The method may be implemented in the forwarding plane. The method includes, for each one of a plurality of destination devices capable of further handling of the data packet for routing toward a further destination, determining 210 a respective cost or utility associated with forwarding the data packet to that one of the plurality of destination devices. The method further includes selecting 220 one of the plurality of destination devices based at least in part on the determined costs or utilities. For example, the destination device with the lowest cost (or the highest utility) may be selected. The method further includes forwarding 230 the data packet to the selected destination device.

It is noted that the cost or utility can be a cost or utility associated with forwarding the data packet from the associated one of the plurality of destination devices toward a potentially final (referred to as further) destination, such as a ground-based terminal. The cost or utility may be based on a distance from the associated one of the plurality of destination devices to the further destination. More specifically, the cost may correspond to a distance, defined along a spherical surface, from the associated one of the plurality of destination devices (e.g. another satellite) to the further destination (e.g. ground-based terminal). The distance-based cost or utility may be determined using a Haversine function or an approximation thereof. The distance-based cost or utility may be determined by computing an inner product of a first vector and a second vector, the first vector originating at a first location, such as center of Earth, and directed toward said one of the plurality of destination devices, the second vector originating at the first location and directed toward said further destination.

It is noted that the distance between devices may be approximated as a distance between two points when projected onto the surface of a sphere. This approach mitigates the possibility that a determined distance does not correspond to a path between satellites (or ground stations) which travels through the earth, when considering a network of global scale. The approximation is particularly useful when the distance between devices is small relative to the size of the sphere (e.g. representing Earth). The distance between two points on the surface of a sphere can correspond to the length of the shortest path between those points, which is referred to as the orthodromic or great circle distance.

In various embodiments, selecting the particular one of the plurality of destination devices is performed using a comparator tree. The comparator tree typically includes multiple stages, each stage having one or more comparators configured to compare pairs of costs or utilities and output an indication of a lower of compared costs or a higher of compared utilities. It is noted that a comparator tree can determine a smallest (or largest) value out of n values using approximately n stages of comparators.

Figure 3:
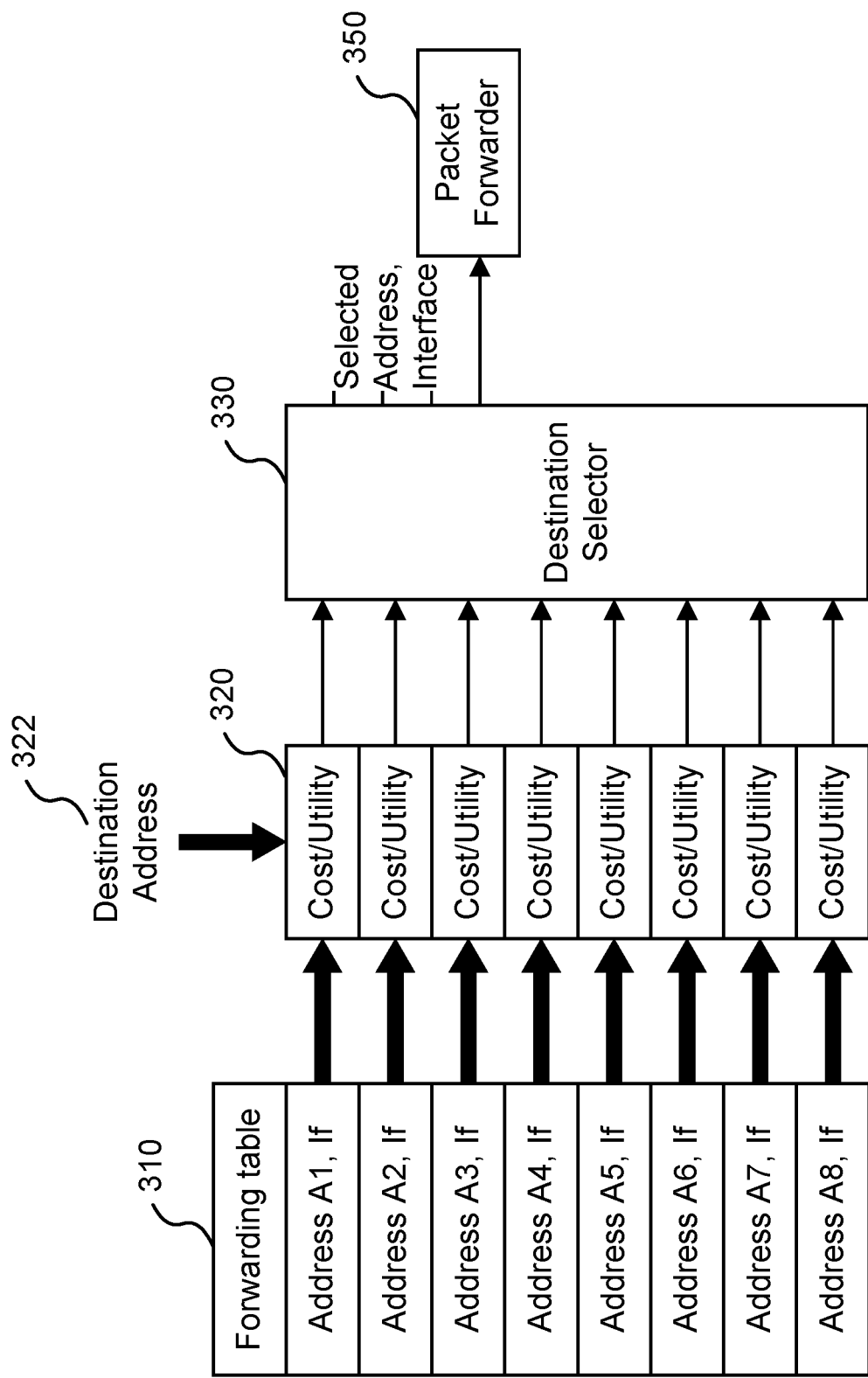
FIG. 3 is a block diagram illustrating forwarding plane operation according to an embodiment of the present invention.

FIG. 3 is a block diagram illustrating forwarding plane operation according to an embodiment of the present invention. A forwarding table 310 contains a set of destination device addresses and the corresponding interfaces usable to forward packets to such destination devices. Although eight destination devices addresses are shown, more or fewer addresses may be present. A cost or utility determiner 320 is provided and configured, for each destination device address, to determine the respective cost or utility associated with forwarding the data packet to that destination device. As mentioned above, the cost may correspond to or otherwise be based on distance from the destination device to a further destination device such as a ground station. The address 322 of the further destination device may be provided, if necessary, and the costs or utilities may be determined based on the address (which may indicate a physical location). A destination selector 330 receives the destination device addresses and costs and selects destination device based on cost or utility, for example selecting a destination device for which costs are lowest or utilities are highest. Once a destination device is selected, a packet forwarder 350 receives the indication of destination device (and associated interface) and forwards the packet toward that destination device.

According to geographic or geometric routing principles, the destination address as well as the destination device addresses can indicate geographic position. For example, an address can include latitude/longitude coordinates or indicate physical position using another coordinate system.

Figure 4:
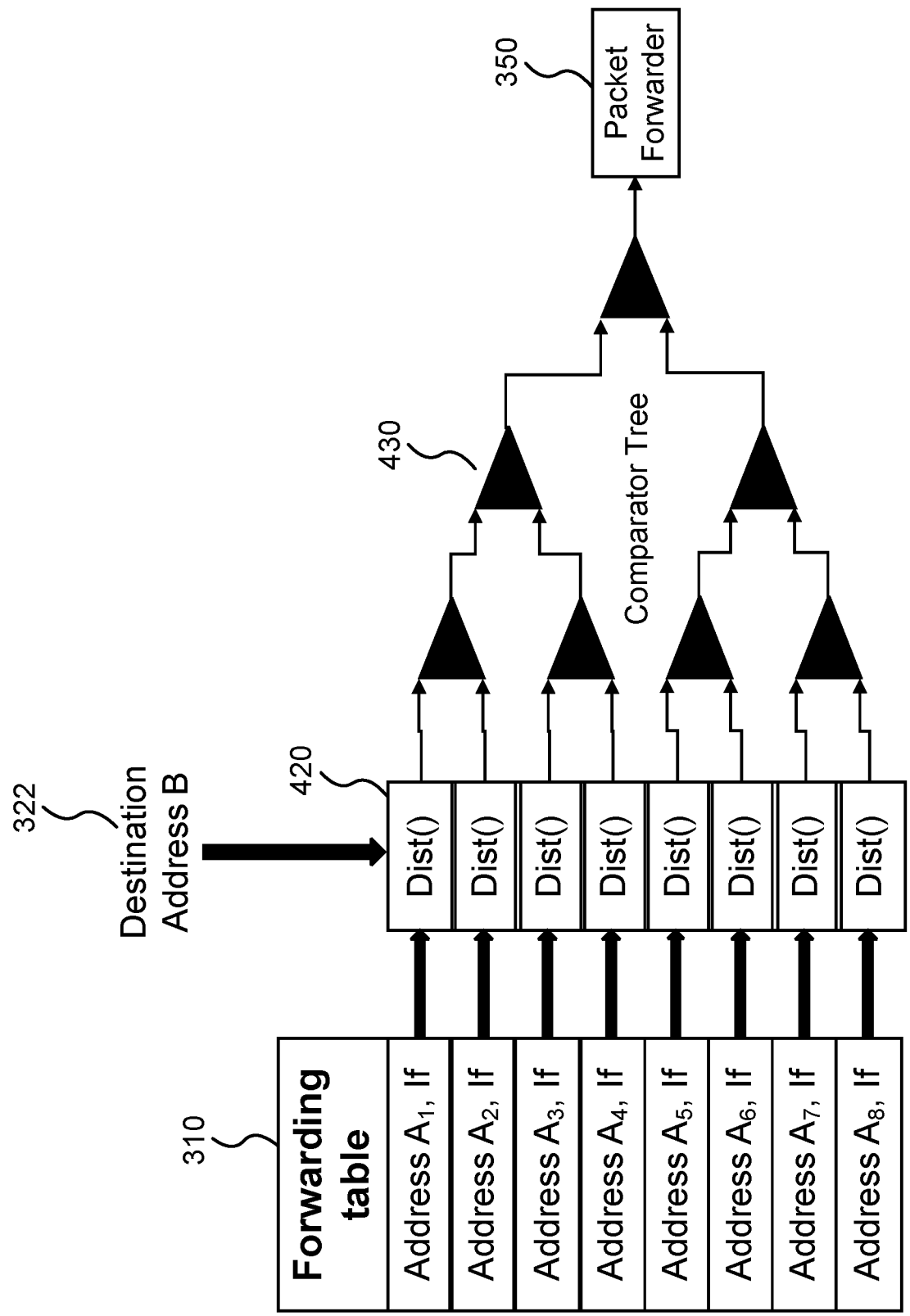
FIG. 4 is a block diagram illustrating forwarding plane operation according to another embodiment of the present invention.

FIG. 4 illustrates a particular variant of the embodiment of FIG. 3, in which the cost or utility determiner 320 is replaced with a distance determiner 420. The distance determiner receives the indication 322 of the further destination address and determines distance from each address in the forwarding table to the further destination address. The determined distance corresponds to the distance along the surface of a sphere, for example as calculated using a Haversine function "hav( )" or other comparable function. The distance value may or may not be an accurate representation of actual distance. However, the distance value should be a monotonic function of actual distance.

The Haversine function is used to determine the great circle distance between two points on the surface of a sphere given their coordinates in latitude and longitude. The Haversine function itself is given by the formula:

$$d = 2r \arcsin\left(\sqrt{\sin^2\left(\frac{\varphi_2 - \varphi_1}{2}\right) + \cos\varphi_1 \cos\varphi_2 \sin^2\left(\frac{\lambda_2 - \lambda_1}{2}\right)}\right)$$

Here, d is the distance, r is the radius of the sphere (earth) and $(\varphi_1, \lambda_1)$ and $(\varphi_2, \lambda_2)$ are the (latitude, longitude) coordinates of the first and second of the two points, respectively. The 2r term can be removed from this formula for computation of a distance metric as it applies equally to all distances.

Further with respect to FIG. 4, the destination selector is replaced with a comparator tree 430. The comparator tree includes multiple two-input, single-output comparators arranged together and cooperatively configured to select the destination address with lowest determined cost (distance). This is achieved by outputting, by each comparator, the destination address associated with the lowest cost between the two destination addresses input to that comparator. In another embodiment, the comparators may be configured to select the destination address with highest determined utility. This is achieved by outputting, by each comparator, the destination address associated with the highest utility between the two destination addresses input to that comparator. It is noted that the (e.g. Haversine-based) distance determiner can be used with other types of destination selectors, and likewise the comparator tree can be used with other types of cost determiners.

It is noted that, while the comparator tree is shown as comparing and passing values (e.g. costs or utilities), ancillary information, such as network addresses or pointers to network addresses, can be attached to these values and passed along with the values. That is, the ancillary information follows the values through the comparator tree network but does not affect the outcome of the comparator operations, either because it is ignored by the comparators or because its weight in the overall value does not affect outcome of comparator operations.

Figure 5:
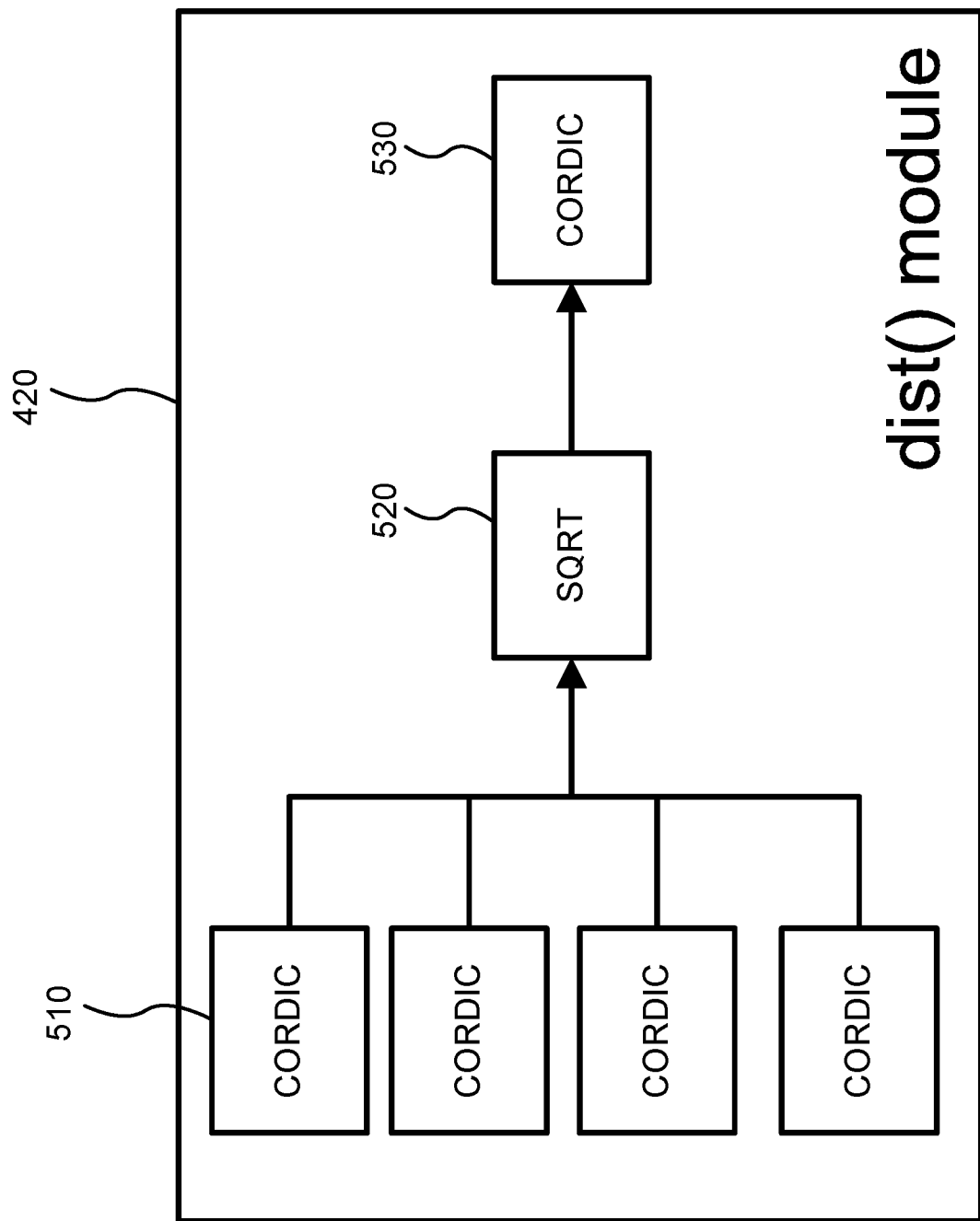
FIG. 5 illustrates a computational component for performing Haversine function calculations.

FIG. 5 illustrates a set of hardware components that can be used to implement computation of a Haversine function in order to implement a distance module 420, according to the prior art. The components include a set of coordinate rotation digital computers (CORDIC) 510, feeding into a square-root computation component 520, and feeding further into a further CORDIC 530. In other embodiments, a lookup table, or hardware implementing a lookup operation, may be used to map input values indicative of device locations (destination device and further destination device) to output values indicative of distance between devices. One or multiple copies of the distance module of FIG. 5 can be provided. If fewer copies of the Haversine module are provided than there are destination device addresses, one or more Haversine modules can be used to determine distance with respect to multiple destination device addresses. Using such dedicated hardware components may improve operating speed in the forwarding plane.

Figure 6:
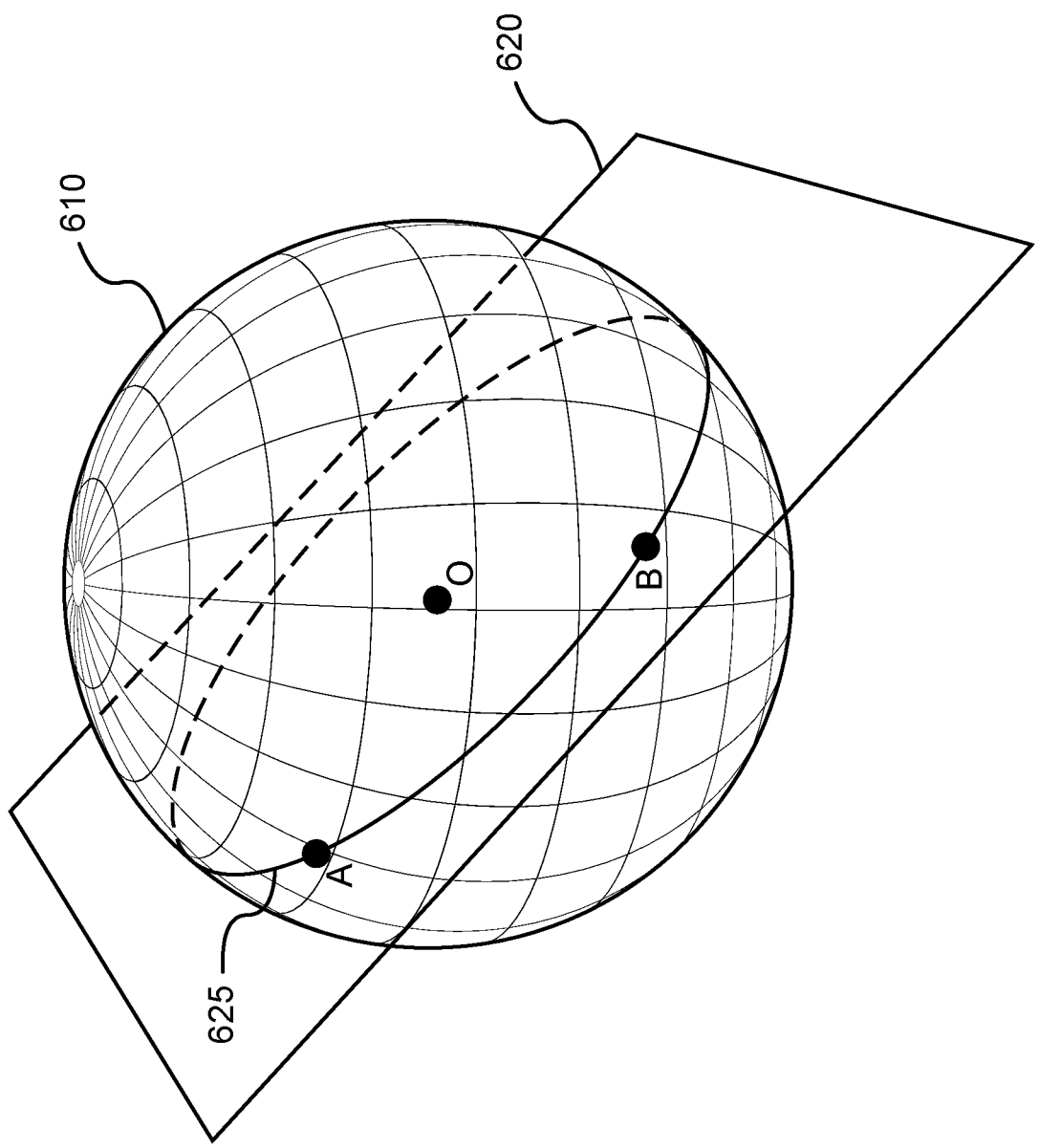
FIG. 6 illustrates the determining of distance between two points A and B on a spherical surface.

As mentioned above, the distance-based cost or utility may be determined by computing an inner product (dot product) of a first vector and a second vector, the first vector originating at a first location, such as center of Earth or other sphere upon which surface distance is to be measured, and directed toward said one of the plurality of destination devices, the second vector originating at the first location and directed toward said further destination. FIG. 6 illustrates two points A and B on a spherical surface 610, the sphere having center O, viewed in a Cartesian coordinate system. The three points A, B and O define a plane 620 in the sense that all three points lie within the plane 620. A first vector can be defined originating from O and extending to A, and a second vector can be defined originating from O and extending to B. Point A can be thought of as location of a destination device (e.g. next satellite to forward packet toward), and point B can be thought of as location of the further destination (e.g. ground station). The first vector is also referred to as A and the second vector is also referred to as B, without ambiguity. The two vectors also equivalently define the plane 620. A circle 625 is inscribed in the plane 620, as the intersection of the spherical surface 610 and the plane 620. A spherical surface distance between the two points A and B can then be defined as the length of the portion (arc) of circle 625 which lies between points A and B. The distance-based cost can be taken to be equal to this distance or an approximation thereof. Arc length for a circle is given by the formula $s = r\theta$, where s is the arc length, r is the radius of the circle, and $\theta$ is the angle (in radians) subtended by the arc from point O. In this case, $\theta$ can also be seen to be the angle between the first and second vectors A and B. This angle is related to the dot product through the formula:

$$A \cdot B = |A||B| \cos \theta \quad (1)$$

Noting that $|A|=|B|=r$, and further normalizing units so that $r=1$, it follows that:

$$s = \theta = \cos^{-1}(A \cdot B) \quad (2)$$

As such, the distance between points A and B can be derived based on the dot product between vectors A and B. The cosine or inverse cosine function is difficult to implement in hardware. However, it has been appreciated by the inventors that the distance-based cost does not have to be an accurate reflection of actual distance in absolute terms. This is because the purpose of computing distance-based cost is to compare costs between alternative destination devices in order to select a destination device with lowest cost. The device with lowest cost should be the device with smallest distance between that device and further destination. For example, the costs or utilities associated with devices should be such that, when a distance between a first device and the further destination is greater than a distance between a second device and the further destination, the cost associated with the first device should be lower than the cost associated with the second device (or the utility associated with the first device should be higher than the utility associated with the second device). However, the cost does not need to accurately equal the distance.

Consequently, for implementation purposes, distance between points A and B, as measured using an approximate metric, only needs to be accurate in relative terms. In other words, if the actual (spherical surface) distance between two points A and B is greater than the actual distance between two points C and D (one of C and D can be equal to one of A and B), then the distance, according to the approximate metric, between A and B should be greater than the distance, according to the approximate metric, between C and D. This should hold for any set of points A, B, C, D.

It is observed that the inverse cosine function is monotonically decreasing over the interval [−1, 1]. Therefore, an approximate metric that is linear and decreasing can be used in place of the inverse cosine function. The approximate metric can be given by:

$$s \approx \pi/2(A \cdot B) + \pi/2 \quad (3)$$

Finally, the approximate distance metric can be scaled by removing the factor of $\pi/2$ without compromising the requirements described above. This is because by any factor (greater than zero) will not affect whether the metric accurately reflects which of two compared distances is greater. In other words, the approximate distance metric:

$$s \approx 1 - A \cdot B \quad (4)$$

can be used, where A and B are unit vectors terminating at two locations A and B. In fact, because all distances are compared with each other, the approximate distance metric:

$$s \approx -A \cdot B \quad (5)$$

can also be used.

Furthermore, the objective of selecting a destination address associated with a minimum distance can be equivalently achieved by selecting a destination address associated with a maximum utility, where utility is approximately the negative of distance. In other words, the utility:

$$u = A \cdot B \quad (6)$$

can also be used.

While center of Earth (or other sphere) is used as an originating point for vectors A and B above, it should be understood that other originating points may also be used. For example, another point interior to the sphere or other object having a curved surface may be used, or another point exterior to the sphere or other object having the curved surface may be used. Although selection of a different point may result in the computed value being an inaccurate reflection of distance, the computed value may still be sufficiently representative of distances such that different locations can properly be compared, as discussed above.

Figure 7:
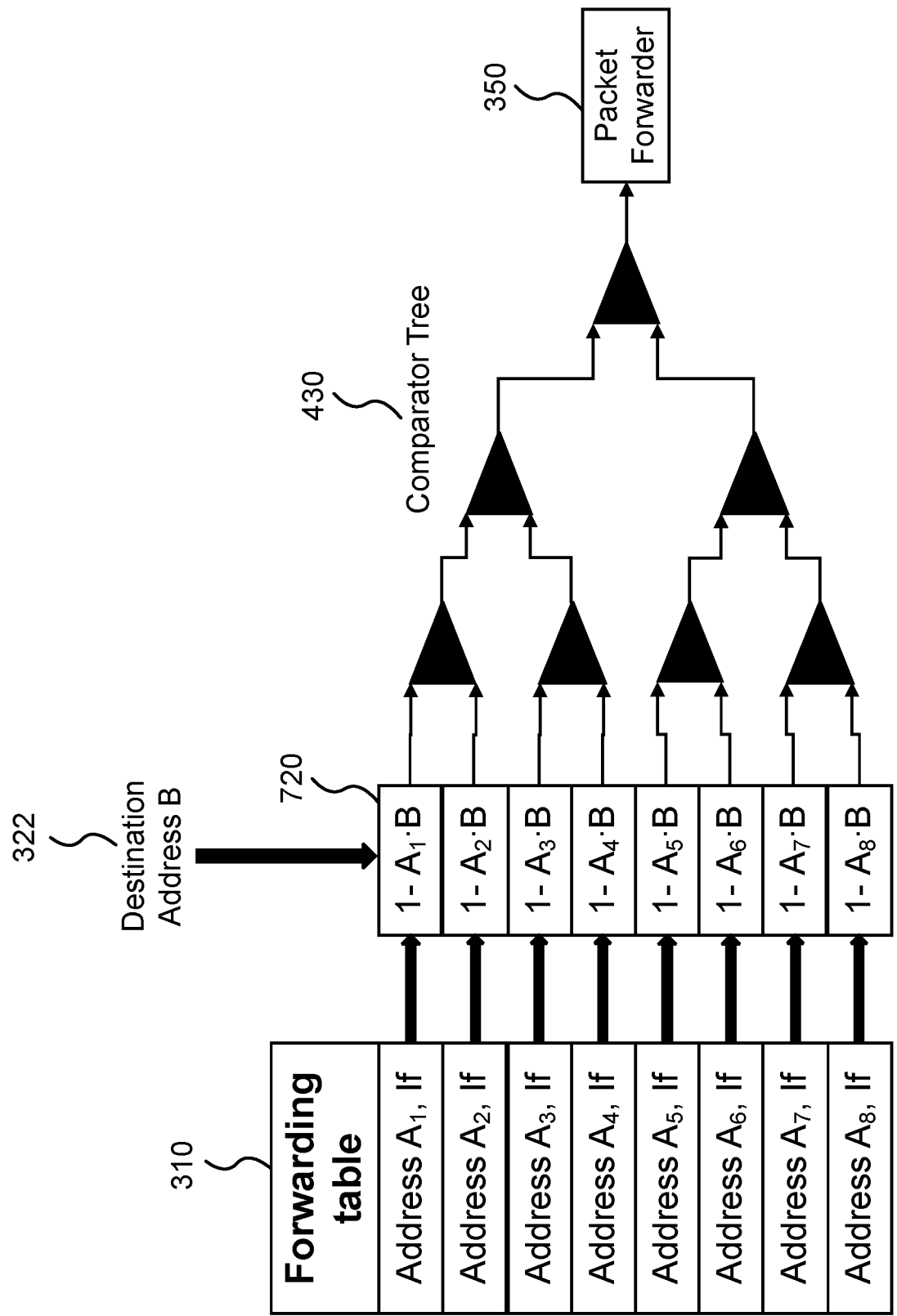
FIG. 7 is a block diagram illustrating forwarding plane operation according to another embodiment of the present invention.

FIG. 7 illustrates a further variant of the embodiment of FIG. 3, in which the cost determiner 320 is a distance-based cost determiner 820 utilizing a negative dot product approach as described above. For each destination device address $A_i$, in the forwarding table and for a given address of a further destination B, where the addresses indicate geographic position on a sphere, the cost determiner computes a distance-based cost according to Equation (4). Here, addresses $A_i$, and B are also used to represent vectors as discussed with respect to FIG. 6. The comparator tree 430 selects the output of the cost determiner 720 which has minimum cost by using component comparators that each outputs the lesser of its two input values. In an alternative, the distance-based cost determiner 820 can compute distance-based cost according to Equation (5). Other comparable costs can also be used.

Figure 8:
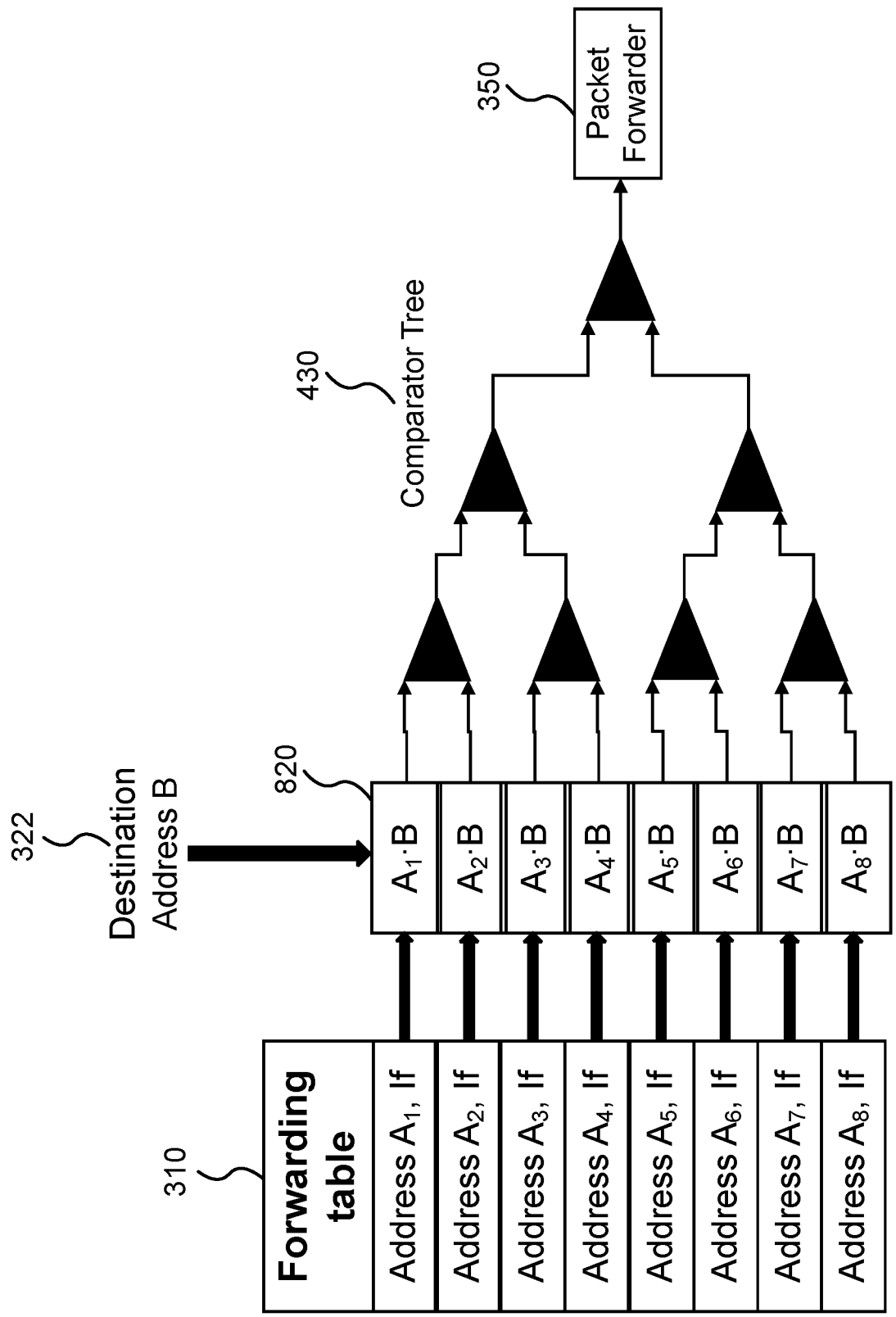
FIG. 8 is a block diagram illustrating forwarding plane operation according to another embodiment of the present invention.

FIG. 8 illustrates a further variant of the embodiment of FIG. 3, in which the cost determiner 320 is a distance-based utility determiner 820 utilizing a dot product approach as described above. For each destination device address $A_i$ in the forwarding table and for a given address of a further destination B, where the addresses indicate geographic position on a sphere, the utility determiner computes a distance-based utility according to Equation (6). Other comparable utilities can also be used. Here, addresses $A_i$ and B are also used to represent vectors as discussed with respect to FIG. 6. The comparator tree 430 selects the output of the utility determiner 820 which has maximum utility by using component comparators that each outputs the greater of its two input values.

Although embodiments of the present invention are described primarily with respect to routing in satellite mesh networks, it should be appreciated that the present invention may also be applied in other network scenarios, such as in other geometric or geographic based routing systems not necessarily involving satellites, or in other non-geometric or non-geographic based routing systems, for example in which packets are routed solely based on network address (e.g. arranged by nested subnets) and network topology. Embodiments of the present invention may be used in mobile networks, internet of things (IoT) networks, etc.

Embodiments of the present invention can be implemented using electronics hardware, software, or a combination thereof. In some embodiments, the forwarding plane is implemented by one or multiple computer processors executing program instructions stored in memory. In some embodiments, the forwarding plane is implemented partially or fully in hardware, for example using one or more field programmable gate arrays (FPGAs) or application specific integrated circuits (ASICs) to rapidly perform the processing operations required for implementing forwarding plane operations. The forwarding plane operations can include determining costs or utilities associated with forwarding data packets to destination devices, determining (e.g. using a comparator tree) destination devices having lowest cost or highest utility, and forwarding of a data packet to the destination device. The determining of a destination device can be performed using sorting and selection hardware which include comparators as described above for example with respect to FIGS. 3, 4 7 and 8. The hardware or software overall can have the architecture described above for example with respect to these same figures.

Embodiments of the present invention, for example those realized in a hardware rather than computer processor implementation, can be implemented using a highly parallel forwarding plane architecture. For example, costs or utilities for multiple destinations can be determined in parallel, and multiple comparator operations in each stage of the comparator tree can be performed in parallel. This facilitates a rapid operation of the forwarding plane. Embodiments of the present invention combine a distance function with a comparator tree implementation to perform forwarding plane operations at line rates.

Figure 9:
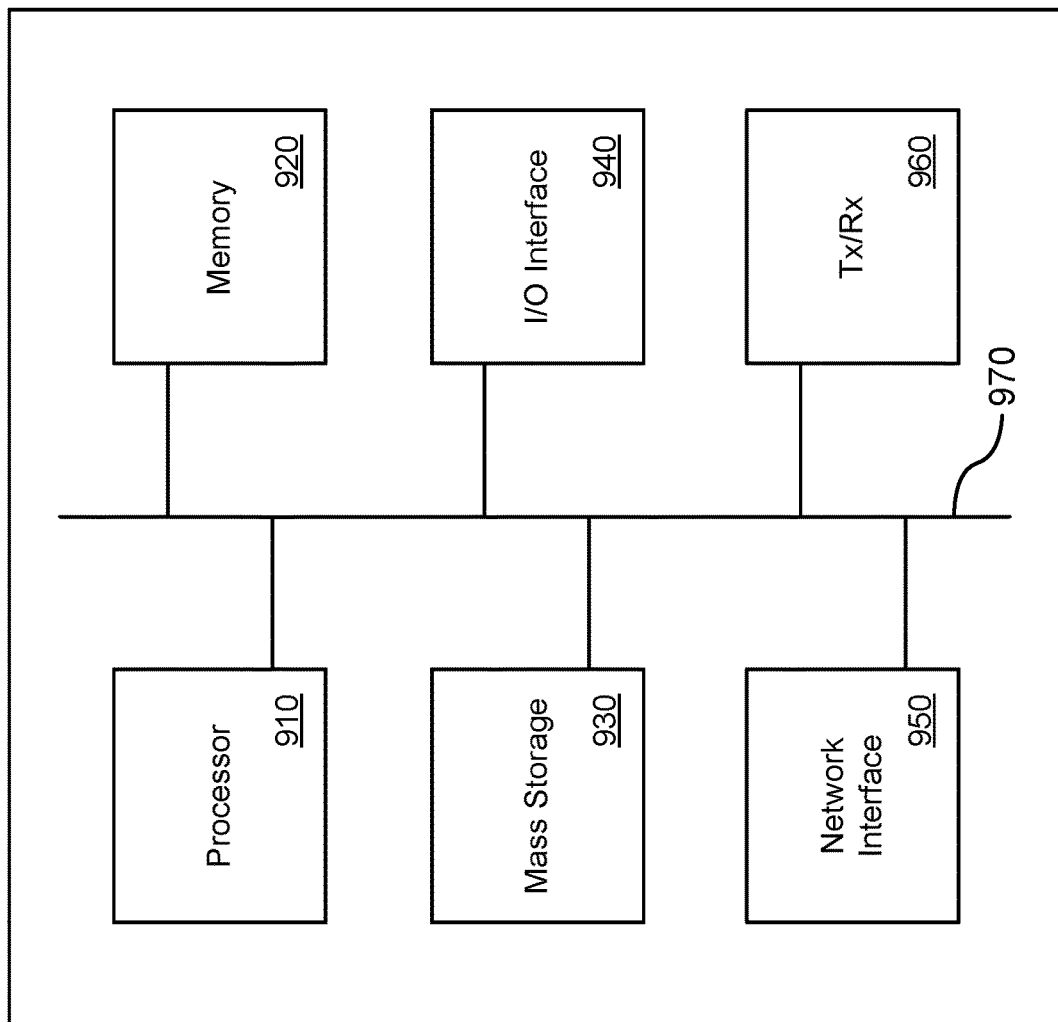
FIG. 9 is a schematic diagram of an electronic device that may perform any or all of operations of the above methods and features explicitly or implicitly described herein, according to different embodiments of the present invention.

FIG. 9 is a schematic diagram of an electronic device 900 that may perform any or all of operations of the above methods and features explicitly or implicitly described herein, according to different embodiments of the present invention. For example, a computer equipped with network function may be configured as electronic device 900.

As shown, the device includes a processor 910, such as a Central Processing Unit (CPU) or specialized processors such as a Graphics Processing Unit (GPU) or other such processor unit, memory 920, non-transitory mass storage 930, I/O interface 940, network interface 950, and a transceiver 960, all of which are communicatively coupled via bi-directional bus 970. According to certain embodiments, any or all of the depicted elements may be utilized, or only a subset of the elements. Further, the device 900 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 920 may include any type of non-transitory memory such as static random access memory (SRAM), dynamic random access memory (DRAM), synchronous DRAM (SDRAM), read-only memory (ROM), any combination of such, or the like. The mass storage element 930 may include any type of non-transitory storage device, such as a solid state drive, hard disk drive, a magnetic disk drive, an optical disk drive, USB drive, or any computer program product configured to store data and machine executable program code. According to certain embodiments, the memory 920 or mass storage 930 may have recorded thereon statements and instructions executable by the processor 910 for performing any of the aforementioned method operations described above.

It should be understood that in many networks including sensor networks and satellite constellations, the arrangement of network nodes follows a grid-like structure. By projecting the destination location into the sphere in which the satellites orbit, the haversine distance metric can be simply used, or as noted above a sufficiently accurate approximation of the haversine. Similarly, in other deployments, such as sensor networks, the inner-product approximation of the haversine function can be employed.

Using a conventional hardware implementation, such as Field Gate Programmable Arrays, of Application Specific Integrated Circuits, a target selection engine can be created. The target selection engine has an input from which it receives a geographic location identifier (such as (x,y,z) coordinates) associated with a destination node. This location identifier is then used in conjunction with the location of each of a plurality of nodes, by the distance metric computation engine, to determine a plurality of distances, each of the determined distances representative of the distance between a network node and the destination node. These distances, along with an identifier associated with the node, can then be entered into a comparator tree which can then select the shortest distance metric, and thus the closest network node to the destination. One skilled in the art will appreciate that as discussed above, the distance metric may be a Haversine function, or it may be an inner product of the components of the location of the destination and each of the nodes.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for routing a data packet in a network, the method comprising:
    for each one of a plurality of destination devices capable of further handling of the data packet for routing toward a further destination, determining a respective cost or utility associated with forwarding the data packet to said one of the plurality of destination devices, wherein the cost or utility is determined by computing an inner product of a first vector and a second vector, the first vector originating at a first location and directed toward said one of the plurality of destination devices, the second vector originating at the first location and directed toward said further destination;
    selecting, using a comparator tree, one of the plurality of destination devices based at least in part on the determined costs or utilities; and
    forwarding the data packet to said selected one of the plurality of destination devices.

2. The method of claim 1, wherein said selecting one of the plurality of destination devices comprises selecting a particular one of the plurality of destination devices having a lowest cost or highest utility.

3. The method of claim 1, wherein the comparator tree includes multiple stages, each stage having one or more comparators configured to compare pairs of said costs or utilities and output an indication of a lower of compared costs or a higher of compared utilities.

4. The method of claim 1, wherein the inner product of the first vector and a second vector represents an orthodromic distance.

5. The method of claim 1, wherein at least one of the plurality of destination devices is a satellite-based network node, and the first location is a location at a center of the Earth.

6. The method of claim 1, wherein each one of the plurality of destination devices is a satellite-based network node, the further destination is a ground-based network node, and the first location is a location at a center of the Earth.

7. An apparatus for routing a data packet in a network, the apparatus comprising:
a cost determiner configured, for each one of a plurality of destination devices capable of further handling of the data packet for routing toward a further destination, to determine a respective cost or utility associated with forwarding the data packet to said one of the plurality of destination devices, wherein the cost or utility is determined by computing an inner product of a first vector and a second vector, the first vector originating at a first location and directed toward said one of the plurality of destination devices, the second vector originating at the first location and directed toward said further destination;
a destination selector configured to receive the determined costs or utilities from the cost determiner and select one of the plurality of destination devices based at least in part on the determined costs or utilities, the destination selector comprising a comparator tree; and
a packet forwarder configured to receive said selected one of the plurality of destination devices from said destination selector and forward the data packet to said selected one of the plurality of destination devices.

8. The apparatus of claim 7, wherein one or both of the cost determiner and the destination selector is implemented using a processor operatively coupled to memory, the memory storing program instructions that, when executed by the processor, cause the processor to implement said one or both of the cost determiner and the destination selector.

9. The apparatus of claim 7, wherein one or both of the cost determiner and the destination selector is implemented using dedicated data processing hardware.

10. The apparatus of claim 7, wherein said selecting one of the plurality of destination devices comprises selecting a particular one of the plurality of destination devices having a lowest cost or highest utility.

11. The apparatus of claim 7, wherein the comparator tree includes multiple stages, each stage having one or more comparators configured to compare pairs of said costs or utilities and output an indication of a lower of compared costs or a higher of compared utilities.

12. The apparatus of claim 7, wherein the inner product of the first vector and the second vector represents an orthodromic distance.

13. The apparatus of claim 7, wherein at least one of the plurality of destination devices is a satellite-based network node, and the first location is a location at a center of the Earth.

14. The apparatus of claim 7, wherein each one of the plurality of destination devices is a satellite-based network node and the further destination is a ground-based network node, and the first location is a location at a center of the Earth.

15. A method for selecting a routable target in a packet data network, the method comprising:
determining, in accordance with a geographic location of the routable target, a distance metric for each of a plurality of network nodes, each distance metric representative of the distance between the respective network node and the geographic location of the routable target, the distance metric being computed as an inner product of location information associated with the nodes and the routable target;
providing each of the determined distance metrics to inputs of a comparator tree, wherein the comparator tree comprises a plurality of levels, each level prior to a last level performing a corresponding plurality of pairwise comparisons in parallel and forwarding results of said pairwise comparisons to a subsequent level, the pairwise comparisons being between pairs of the determined distance metrics; and
receiving from an output of the comparator tree an indicator associated with a network node form the plurality of network nodes associated with the smallest distance metric.

16. A target selection engine for selecting a node from a plurality of node, the selection engine comprising:
an input for receiving a geographic location identifier associated with a destination node;
a distance metric computation engine for computing a plurality of distance metrics, each of the distance metrics associated with a node from the plurality of nodes indicative of a distance from the associated node to the received geographic indicator, each distance metric representative of the distance between the respective network node and the geographic location of the routable target, the distance metric being computed as an inner product of location information associated with the nodes and the routable target;
a comparator tree for receiving the plurality of distance metrics and for selecting the smallest distance metric, wherein the comparator tree comprises a plurality of levels, each level prior to a last level performing a corresponding plurality of pairwise comparisons in parallel and forwarding results of said pairwise comparisons to a subsequent level, the pairwise comparisons being between pairs of the plurality of distance metrics.

17. The target selection engine of claim 16, wherein the inner product represents an orthodromic distance.

* * * * *